Sept. 9, 1969 M. MICHAELIS 3,465,800
ELECTRICALLY DRIVEN KITCHEN IMPLEMENT
Filed Nov. 14, 1967 2 Sheets-Sheet 1

Inventor:
Manfred Michaelis
by Michael S. Striker
Attorney

Sept. 9, 1969   M. MICHAELIS   3,465,800
ELECTRICALLY DRIVEN KITCHEN IMPLEMENT
Filed Nov. 14, 1967
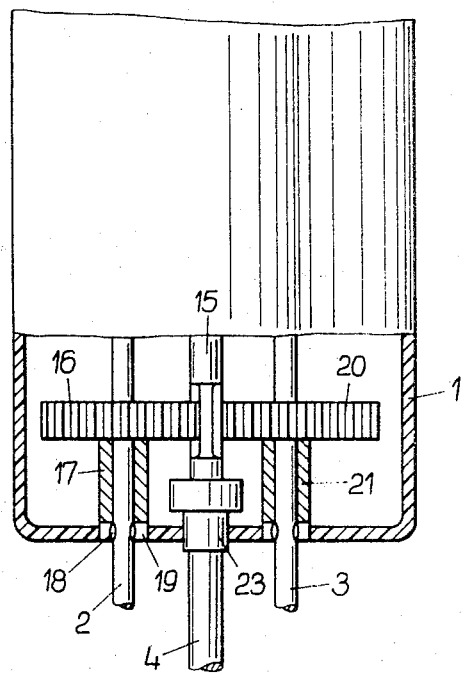
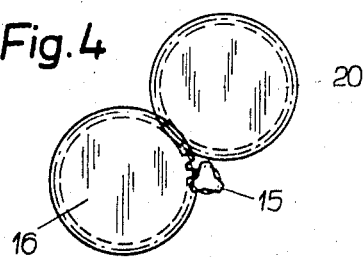

3,465,800
ELECTRICALLY DRIVEN KITCHEN IMPLEMENT
Manfred Michaelis, Langen, Germany, assignor to Braun Aktiengesellschaft, Frankfurt, Germany
Filed Nov. 14, 1967, Ser. No. 682,861
Claims priority, application Germany, Nov. 15, 1966, B 89,830
Int. Cl. B02c; B01f 7/00, 9/00
U.S. Cl. 146—68                           12 Claims

ABSTRACT OF THE DISCLOSURE

A portable electrically driven kitchen implement which is provided with at least two driven shafts projecting beyond one end of the housing of the implement and extending parallel to the drive shaft of an electromotor in the housing and connected to the drive shaft by gear transmission including a gear on each driven shaft and pinion means on the drive shaft meshing with at least one of the gears and having at most four gear teeth.

BACKGROUND OF THE INVENTION

The present invention relates to an electrically driven portable kitchen implement with a plurality of driven shafts, constructed preferably as stud shafts and adapted to carry at the free ends thereof different kitchen tools.

One kitchen implement of this type known in the art has a single stud shaft and another has a plurality of stud shafts. Both of these known kitchen implements have a stepdown transmission between the electromotor and the driven shafts in the form of a worm gear drive and both have a handle laterally extending from the motor housing for carrying the implement. Both of these known implements have the disadvantage that due to the worm gear drive the output of the implement is considerably reduced. Another disadvantage of these known kitchen implements is that the handle projecting laterally from the motor housing does not permit an easy handling and guiding of the implement as is obtainable with another known implement in which the motor housing itself is formed as a handle. In this other implement, one of the driven shafts extends in the direction of the motor shaft, but the second driven shaft extends at a right angle with respect thereto. This known construction also has the disadvantage that the implement is difficult to handle and that its output is also reduced.

An electrically driven kitchen implement is also known which has a plurality of parallel driven shafts. This kitchen implement is supported on a stand and a portion of the drive shaft of its motor is formed as a pinion which drives over a spur gear a second pinion coaxially arranged with the spur gear and which in turn meshes with a second spur gear fixed to one of the driven shafts for rotation therewith. The other driven shafts are driven by additional spur gears meshing with one of the aforementioned pinions. Such a stepdown transmission necessarily requires considerable space. In addition, its construction is relatively complicated and therefore expensive and its weight is considerable so that the implement has to be mounted on a stand and cannot serve as a portable implement.

It is an object of the present invention to overcome the disadvantages of kitchen implements of the aforementioned kind.

It is a further object of the present invention to provide a kitchen implement of the aforementioned kind in which the driven shafts extend parallel to each other and parallel to the motor shaft and in which the transmission between motor shaft and driven shafts is simple in construction while providing an improved output.

It is a further object of the present invention to provide a relatively light kitchen implement which can be conveniently handled and does not require a stand for its support.

SUMMARY OF THE INVENTION

With these objects in view, the portable electrically driven implement according to the present invention, especially for kitchen use, mainly comprises housing means, an electro-motor mounted in the housing means and having a drive shaft, a pair of driven shafts turnably supported in the housing means and extending substantially parallel to the drive shaft beyond one end of the housing means, and transmission means between the drive shaft and the driven shafts and comprising a pair of spur gears respectively mounted on said driven shafts and pinion means on the drive shaft having at most four gear teeth and meshing with at least one of the aforementioned spur gears.

The gear tooth system may, for instance, be constructed as a 20° involute gearing for parallel axes.

The pinion has preferably only three teeth which extend either parallel to the pinion axis or inclined at an angle with respect thereto.

A kitchen implement of the above construction may be provided with a plurality of fast and/or slowly rotating tools as, for instance, stirring rods or whisks, positioned in a manner so that the implement can be operated while being held in the hand of the operator. Additional advantages of the kitchen implement according to the present invention are that the space requirements of the implement are small, its output is improved, and that the weight of the gear transmission with a pinion having at most four teeth is relatively small.

In a preferred embodiment, the gear transmission may be supported in a housing part which is releasably connected to the remainder of the housing so that when a drive at high speed is desired, the gear transmission may be removed and friction losses during high speed drive be thus avoided.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 3 is a partial, partially sectioned side view, similar to FIG. 2, and illustrating a different embodiment; and FIG. 4 is a schematic top view of the gear transmission according to the present invention as used in the kitchen implement.

DESCRIPTION OF THE PREFERRED EMBODIMENTS

Figure 1:
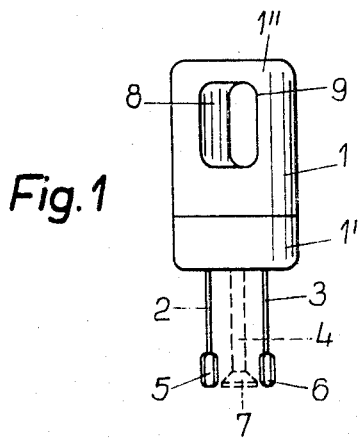
FIG. 1 is a schematic side view of the kitchen implement according to the present invention.

Referring now to the drawings, and more specifically to FIG. 1 of the same, it will be seen that the kitchen implement according to the present invention mainly comprises an elongated housing 1 provided on its upper part with a gripping aperture 8 so that the implement may be easily gripped with one hand of the user. An electrical switch 9, only schematically illustrated in FIG. 1, is located laterally of the gripping aperture 8. A pair of stud shafts 2 and 3 extending parallel to the longitudinal axis of the housing 1 project outwardly from one end face, respectively carrying on the free ends thereof relatively slowly rotating stirring tools or whisks 5 and 6, and a third stud shaft 4 coaxially with the longitudinal axis of the housing 1 may also be provided and carrying at its free end a fast rotating comminuting tool 7.

Figure 2:
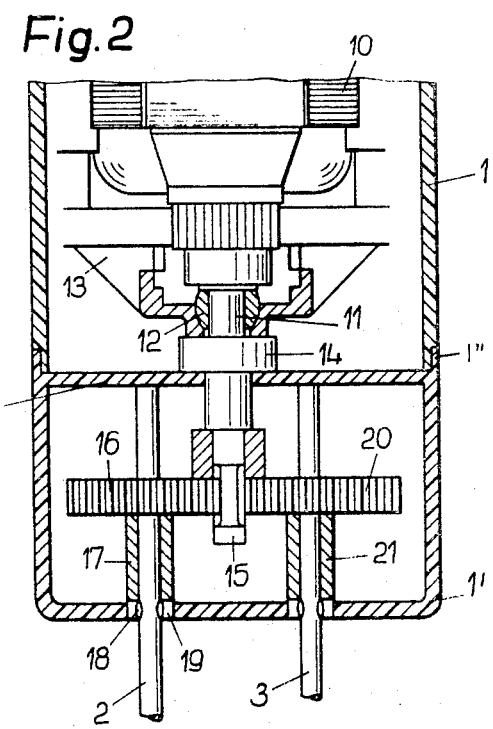
FIG. 2 is a partial sectioned side view of the implement as shown in FIG. 1, and drawn to an enlarged scale.

As shown in FIG. 2, an electromotor 10, only partially illustrated in this figure, is mounted in the upper part of the housing coaxial with the longitudinal axis of the latter. The motor shaft or drive shaft 11 is turnably mounted in a callote 12, which in turn is supported in a correspondingly shaped depression of the motor housing 13. A coupling 14 of known construction is fixed to the drive shaft 11 for rotation therewith and serves to releasably connect to shaft 11 a coaxial shaft with a pinion 15 having three teeth. The pinion 15 meshes with the stud shaft 2 extending parallel to the axis of the motor 1 and driving the tool 5. The pinion may be mounted on the aforementioned shaft which is releasably connected to the coupling 14 or a portion of the shaft may be formed as a pinion.

The upper end of the stud shaft 2 is mounted in a sleeve 17, which in turn is turnably mounted in the lower part 1' of the housing 1. The stud shaft 2 is in a known manner releasably held in the sleeve 17 by a spring, not shown in the drawing, and secured against turning with respect to the sleeve by means of integral ears 18 and projecting to opposite sides into cavities 19 formed in the sleeve 17. The spur gear 16 is releasably connected in a known manner to the upper end of the sleeve 17 coaxially therewith.

A second spur gear 20 meshes with the spur gear 16 and is releasably connected to a second sleeve 21 turnably mounted in the housing part 1', to which the second stud shaft 3 is connected in the same manner as described above in connection with stud shaft 2 and sleeve 17. In the embodiment as shown in FIG. 2, the lower housing part 1' has an upper annular flange portion 1" extending in axial direction and engaging with a tight fit a corresponding flange portion on the upper housing part 1 so that the lower housing part and the gear drive located therein may be removed from the upper housing part. The upper housing part 1 which is formed with the gripping opening 8 may carry besides the motor 10 also batteries, not shown in the drawing, for driving the motor. When the lower housing part 1' with the gear drive carried thereby is removed from the upper housing part, another stud shaft 4 for driving a fast rotating comminuting tool 7, as indicated in dotted lines in FIG. 1, may be connected to the coupling 14. The upper end of the lower housing part 1' may be closed by transverse wall 22.

FIG. 3 partly illustrates a second embodiment according to the present invention in which the gearing of the implement is not located in a separate housing part which is releasably connected to the remainder of the housing, but in the embodiment as shown in FIG. 3 the gearing is located in a lower portion of the housing 1. In this embodiment, the drive shaft of the motor extends nearly to the bottom of the housing and a portion of the drive shaft is formed as a three-toothed pinion 15. The pinion 15 meshes again with a spur gear 16 releasably connected to a sleeve 17 extending parallel to the drive shaft and being turnably mounted in the bottom wall of the housing. A stud shaft 2 is again releasably inserted into the sleeve 17 and secured against turning with respect to the latter by lateral ears 18 extending in corresponding cutouts 19 of the sleeve 17. The spur gear 16, in turn, meshes with the other spur gear 20, as shown in FIG. 4, and the spur gear 20 is releasably connected to a sleeve 21, extending parallel to the sleeve 17 and turnably mounted in the bottom wall of the housing. The sleeve 21 receives the stud shaft 3 releasably connected thereto in the same manner as stud shaft 2 is releasably connected to the sleeve 17. The drive shaft with the pinion 15, carries at its lower end a coupling 23 of known construction, extending with its lower end portion through a corresponding bore through the bottom wall of the housing and adapted to receive a shaft 4 carrying at its end, for instance, a comminuting tool 7, as shown in FIG. 1. The motor for driving the shafts of the implement of the embodiment shown in FIG. 3 is not illustrated therein and this motor may be connected by means of a cable and plug, not shown, to the network. Of course, the electrical implement shown in FIG. 3 may also be constructed to be driven by batteries arranged in the housing of the implement and the implement shown in FIG. 2 may be constructed for connection to a network.

In both embodiments the implement may be used selectively either with two relatively slowly rotating tools connected thereto, or with one fast rotating tool. The shafts for rotating the tools are always parallel to each other and parallel to the longitudinal axis of the elongated housing so that the implement may always be handled in a very convenient manner.

It will be understood that each of the elements described above, or two or more together, may also find a useful application in other types of portable electrically driven kitchen implements differing from the types described above.

While the invention has been illustrated and described as embodied in a portable electrically driven kitchen implement which can be selectively provided with two relatively slow rotating driven shafts extending parallel to the longitudinal axis of the implement or with a single fast rotating driven shaft coaxially arranged with the aforementioned axis, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, comprehended within the meaning and range of equivalence of the following claims.

What is claimed as new and desired to be protected by Letters Patent is set forth in the appended claims.

1. A portable electrically driven implement, especially for kitchen use, comprising, in combination, housing means; an electromotor mounted in said housing means and having a drive shaft; a pair of driven shaft means turnably supported in said housing means and extending substantially parallel to said drive shaft beyond one end of said housing means; and speed reduction transmission means between said drive shaft and said driven shaft means and consisting of a pair of spur gears respectively mounted on said driven shaft means and pinion means on said drive shaft having at most four gear teeth and meshing at least with one of said spur gears.

2. An implement as defined in claim 1, wherein said pinion means has only three gear teeth.

3. An implement as defined in claim 1, wherein said pinion means meshes with one of said pair of spur gears and the other of said pair of spur gears meshes with said one spur gear.

4. An implement as defined in claim 1, wherein said housing means comprises a first housing member housing said electromotor, and a second housing member releasably connected to said first housing member and housing said transmission means, said drive shaft projecting from said first into said second housing member and said driven shaft means being turnably mounted in said second housing member.

5. An implement as defined in claim 4, wherein said housing means is elongated, and wherein said first housing member is formed with a gripping opening therethrough transverse to the direction of elongation of said housing means.

6. An implement as defined in claim 1, and including coupling means on said drive shaft for selectively connecting said pinion means and another shaft to said drive shaft.

7. An implement as defined in claim 4, and including coupling means on said drive shaft for selectively attaching said pinion means to said drive shaft when said second housing member housing said transmission means is connected to said first housing member, and to attach an additional driven shaft to said coupling means when said second housing member with said transmission means and said pair of driven shafts are removed from said first housing member.

8. An implement as defined in claim 1, wherein the teeth of said pinion are directly formed in said drive shaft, and including coupling means fixed to said drive shaft for connecting another driven shaft to said drive shaft.

9. An implement as defined in claim 1, wherein each of said driven shaft means comprises a sleeve turnably mounted in said housing means and a stud shaft having one end received in the sleeve and being releasably connected thereto for turning with the latter.

10. An implement as defined in claim 1, wherein said spur gears and said pinion means are constructed as a 20° involute gearing for parallel axes.

11. An implement as defined in claim 4, and including stirring tools attached to the ends of said pair of driven shaft means extending beyond said second housing member, and coupling means on said drive shaft for selectively attaching said pinion means to said drive shaft when said second housing member housing said transmission means is connected to said first housing member and to attach an additional shaft to said coupling means when said second housing member with said transmission means and said pair of driven shafts are removed from said first housing member, and a comminuting tool attached to the free end of said additional shaft, whereby said implement may selectively be used to provide a relatively slow stirring action or a fast comminuting action.

12. An implement as defined in claim 9, and including a stirring tool connected to the free end of each stud shaft, coupling means fixed to said drive shaft for connecting an additional shaft thereto, and a comminuting tool fixed to the free end of said additional shaft, whereby said implement may selectively be used to provide a relatively slow stirring action or a fast comminuting action.

References Cited

UNITED STATES PATENTS

| | | | |
|---|---|---|---|
| 3,299,924 | 1/1967 | Hanschitz | 146—68 |
| 3,335,772 | 8/1967 | Menge | 146—68 |
| 457,606 | 8/1891 | Norcross | 74—665 X |
| 2,762,613 | 9/1956 | Burton | 74—665 X |
| 2,798,700 | 7/1957 | Corbett et al. | 74—665 X |
| 2,879,675 | 3/1959 | Morris | 74—665 |

ARTHUR T. McKEON, Primary Examiner

U.S. Cl. X.R.

259—58; 74—665